United States Patent [19]

Lindenberger

[11] 4,127,494

[45] Nov. 28, 1978

[54] POLYETHER POLYAMINES HAVING INVERSE WATER SOLUBILITY AS STREAM GENERATION AIDS

[75] Inventor: William H. Lindenberger, Darien, Ill.

[73] Assignee: Nalco Chemical Company, Oak Brook, Ill.

[21] Appl. No.: 889,583

[22] Filed: Mar. 23, 1978

Related U.S. Application Data

[63] Continuation-in-part of Ser. No. 772,379, Feb. 28, 1977, abandoned, which is a continuation-in-part of Ser. No. 707,597, Jul. 22, 1976, abandoned.

[51] Int. Cl.$^2$ .................... C09K 5/04; F22B 1/08
[52] U.S. Cl. ........................... 252/77; 252/180
[58] Field of Search ............. 252/77, 73, 71, 75, 252/67, 180, 175; 21/2.7 R; 210/58

[56] References Cited

U.S. PATENT DOCUMENTS

| 2,575,276 | 11/1951 | Jacoby et al. | 252/321 |
|---|---|---|---|
| 2,575,298 | 11/1951 | Ryznar | 252/321 |
| 2,757,142 | 7/1956 | Ryznar | 252/73 |
| 3,017,343 | 1/1962 | Pollitzer | 252/77 X |
| 3,029,125 | 4/1962 | Hummel | 21/2.7 R |
| 3,424,681 | 1/1969 | Stanford | 21/2.7 R X |
| 3,505,237 | 4/1970 | Steinhauer | 252/180 |
| 3,666,404 | 5/1972 | Hwa et al. | 252/75 X |
| 3,990,986 | 11/1976 | Gabel et al. | 252/DIG. 8 X |

FOREIGN PATENT DOCUMENTS 1,096,836  1/1961  Fed. Rep. of Germany ........... 252/180

*Primary Examiner*—Harris A. Pitlick
*Attorney, Agent, or Firm*—John G. Premo; Robert A. Miller

[57] ABSTRACT

A method for increasing the efficiency of steam generation units operating at pressures of from 0–500 pounds per square inch is disclosed. This is accomplished by adding to the water used to generate the steam from 5–400 parts per million of a polyether polyamine having complete solubility in cold water and substantial insolubility in hot water.

8 Claims, No Drawings

POLYETHER POLYAMINES HAVING INVERSE WATER SOLUBILITY AS STREAM GENERATION AIDS

This is a continuation-in-part of copending application Ser. No. 772,379 filed Feb. 28, 1977 and now abandoned which in turn is a continuation-in-part of copending application Ser. No. 707,597 filed July 22, 1976 and now abandoned.

INTRODUCTION

With the growing shortage of fossil fuels, the use of alternate sources of fuel, more efficient combustion systems, and higher efficiency utilization of heat sources are being seriously studied. One problem with complete modification of existing plants is the capital expenditure involved as well as the time and equipment necessary for the manufacture and fabrication for use of alternate sources of fuel.

Most large industrial plants requiring a source of energy for heating and the like utilize steam power. This is due to the fact that these types of operations are relatively inexpensive as far as initial capital, and boilers used to generate steam can use waste fuels such as residual oils, bark and proteinaceous waste material. While methods have been developed which enable steam generation units of this type to operate efficiently, it would be a great advantage to the art if a method could be found for increasing the steam generation capabilities of equipment of this type without elaborate redesign and substantial expenditures of capital investment.

It would, therefore, be an advancement to the art and is, in fact, the subject of this invention, to provide a means for increasing the efficiency of steam generation units by the addition to the water contained within the steam generation unit of a polyether polyamine.

PRIOR ART

Prior art on the use of chemicals for increasing the efficiency of boiling water shows that a great variety of additives have been tested. These additives range from simple inorganic salts to complex surfactants. Several references have shown that trace amounts of various additives in water will change its boiling characteristics.

Dunskus, *Trace Additives in Boiling Liquids*, a Ph.D. thesis available from University Microfilms, studied eleven organic substances upon the heat transfer to boiling iso-propanol. Among the compounds studied were two members of a homolagous series of nonlyphenol polyoxyethylene ethanols. Roll and Myers in J. Chem. Eng. Data, Vol. 9, No. 2, p. 256–258 (1964) discloses the effects of various Tween, Aerosol and Hyonic surfactants upon the surface tension of boiling water. In all cases, the surface tension was lowered. Jontz and Myers in A.I.Ch.E. Journal, Vol. 6, p. 34–38 (1960) discloses the effects of surface tension of water utilizing various surface active agents. Boiling coefficients were shown to be raised when additives of this type were added to the water. Beer, in Prog. Heat Mass Transfer (1969), Vol. 2, p. 311–370, discloses that surfactants added in simulated experiments using air bubbles that a drift stream follows the rising bubbles and carries the superheated liquid away from the surface. It is also disclosed that surfactants decreased the rate of change of surface tensions with temperatures and, therefore, the rate of bubble growth. Lowery, in Ind. Eng. Chemistry, Vol. 49, p. 1445–1448 (1957) discloses that the addition of several surfactants to boiling methanol increased the heat flux markedly and suggested a nucleation mechanism for this phenomenon. Kotchaphakdee, et al., in International Journal of Heat Mass Transfer (1970), Vol. 13, No. 5, p. 835–848, discloses that the heat transfer and the nucleate pool boiling of dilute aqueous polymer solutions including polyacrylamide and (hydroxy ethyl) cellulose increased the heat flux at atmospheric pressures. Since acrylamide is not a surfactant, the article indicates and concludes that surface tension is believed to be only a minor variable and explanations are proposed indicating that the phenomena is based on limited polymer solubility and solution viscoelasticity. Chashchin, et at., in *Izv. Vyssh. Usheb. Zaved. Energ.*, 1973, Vol. 16, No. 8, at CA80:49694v discloses that heat transfer during the flow of water containing polyacrylamide or polyethylene oxide is decreased and the heat transfer coefficiency becomes more pronounced with increasing molecular weight.

While the above references indicate that polymeric substances have been utilized and carefully studied to determine their effect on heat transfer, the above references tend to deal with experiments that are performed at atmospheric pressures and do not take into account serious problems which occurred in normal steam generation units, including foaming which can cause carryover of impurities into the steam generation unit at pressures encountered.

OBJECTS

It is an object of this invention, therefore, to provide to the art a method for increasing the efficiency of steam generation units.

A further object of this invention is to provide to the art a method for increasing the steam output from steam generation units by adding to the water contained within said steam generation unit a polyether polyamine, said compound having complete solubility in cold water but being substantially insoluble in hot water.

THE INVENTION

In accordance with this invention, it has now been discovered there is a series of compounds which may be broadly designated as high molecular weight polyether polyamines, that are very effective additives in increasing the efficiency of steam generation units.

The method utilized in this invention for increasing the efficiency of steam generation units operating at pressure of from 10–200 psi generally comprises the steps of:

A. Adding to the water in the steam generation unit that is used to generate steam from 5–400 ppm of a polyether polyamine;

B. Generating steam from the water contained in the steam generation unit; and then, C. Recovering an increased amount of steam from said steam generation unit.

THE POLYETHER POLYAMINES

The polyether polyamines useful in this invention are synthetic products with a polyalkylene oxide base. The polyalkylene oxide base material usually has a molecular weight of from 100 to 1,000 and may furthermore be formed by the use of any lower alkylene oxides or mixtures thereof. These alkylene oxides include ethylene oxide, propylene oxide and butylene oxide.

For the use in our invention, we prefer to use a polyalkylene oxide which has a moderate molecular weight, usually varying from 250 to 750. Additionally, we prefer to use a polyalkylene oxide which has both ethylene and propylene oxide units contained in it. The ratio of ethylene oxide may vary from 90:10 to 10:90. Ideally, we prefer to use a polyalkylene oxide which has a ratio of ethylene oxide to propylene oxide units of about 50:50 to 90:10. While butylene oxide may be used, we prefer to avoid this material due to its limited solubility in water when formed into a polyether polyamine useful in our invention. It is understood that both polyethylene oxide and polypropylene oxide by themselves will provide a suitable base for the polyether polyamine.

The polyalkylene oxides are then reacted with a difunctional epoxide compound using a cationic catalyst at temperatures of 40°–100° C. for ½ to 2 hours. The difunctional epoxide compound which we prefer to use is epichlorohydrin due to its reactive nature and its commercial availability. It should be understood that other difunctional epoxides useful in our invention may include epiiodohydrin, and epibromohydrin. Additionally, compounds which will provide a reactive hydroxyl group at the ends of the polyalkylene oxide chain and which furthermore will leave a reactive site such as a halogen on the molecule for further reaction with an amine are contemplated in our invention.

The cationic catalysts used to "cap" the polyalkylene oxide with the difunctional epoxide can be anyone of a number of well known catalysts or mixtures thereof. A preferred catalyst is boron trifluoride. The mole ratio of hydroxyl groups present on the polyoxyalkylene oxide to lower difunctional epoxide compound can vary from 0.5:1 to 1:0.5. Preferably, the mole ratio of hydroxyl groups on the polyoxyalkylene oxide to lower difunctional epoxide will be 1:1.

The polyether polyamines of this invention are then formed by reacting the capped polyalkylene oxide with a lower aliphatic amine having from 2–8 carbon atoms. Preferably, the amine should have two or more amino groups. Among the suitable amino compounds which can be used include butylene diamine, propylene diamine, pentylene diamine, hexamethylene diamine, and other higher homologues in the same series.

Due to the availability and the price of raw materials, it is often advisable to employ as this amine crude materials such as bottoms from the distillation of hexamethylene diamine which contain hexamethylene diamine, hexamethylene triamine, and other homologues. The reaction of the capped polyalkylene oxide with the amine having 2–8 carbon atoms is carried out at temperatures ranging from 90°–140° C. In the preferred method of carrying out this reaction, the capped polyalkylene oxide is added to the amine compound incrementally or continuously so as to maintain the desired temperature. If the amine is added to the capped polyalkylene oxide, gellation of the final product can occur due to cross linking between the modified polyalkylene oxides.

We generally prefer to add the capped polyalkylene oxide to the amine in a molar ratio of from 1:5 to 1:1 based on the number of amino groups present in the amine compound and the number of halogens, or other reactive anions on the capped polyalkylene oxide.

This material may be further treated with a difunctional compound capable of cross linking the resultant material. Examples of materials which fall in this category include those containing two reactive halogen atoms which may react with the amine groups present on the modified polyoxyalkylene oxide such as ethylene dichloride, 1,4-dichloro butene-2, propylene dichloride, and ethylene dibromide. Other suitable cross linking agents include epihalohydrins and other compounds containing at least two functional groups which include trifunctional and tetrafunctional compounds which have at least two functional groups which are reactive with the amine or hydroxyl functionalities remaining on the amine modified capped polyoxyalkylene oxide.

The cross linking agent is usually added to the amine modified capped polyalkylene oxide in small amounts varying from 0.1 to 1.6 moles of cross linking agent for each mole of amine functionality added in the previous step. The cross linking agent is added to the amine modified capped polyalkylene oxide (polyether polyamine) is added at temperatures of from 40°–100° C. for a short period of time usually 15 minutes to 1 hour in order to insure the reaction of the cross linking agent with the polyalkylene polyamine.

We have sometimes found it necessary to incorporate cross linking agents of the type discussed above into the polyether polyamines useful in our invention in order to insure that they increase steam generation activity. While it is foreseen that if a cross linking reaction occurs between the amine and the capped polyalkylene oxide material this step would perhaps not be necessary, we prefer to build up the molecular weight by this step in order to insure reproducible activity.

It is important to remember, however, that the polyether polyamine formed above be water soluble. Thus, excess amounts of cross linking agents should be avoided. Also since the polyether polyamine tends to be very viscous at ordinary temperatures, the addition of water to this material as a dilutant is oftentimes necessary.

The polymers of the above type have inverse water solubility, i.e., are substantially soluble in cold water and insoluble in hot water. These polymers are more fully described in U.S. Pat. No. 3,990,986 filed Dec. 19, 1974 assigned to the assignee of the instant application.

The above compounds are generally added to the water utilized in producing steam. Steam generation units operating at pressures of from 0–500 and, preferably, 5–200psi, are contemplated in the use of the compounds of our invention. Generally from 1–500 and, preferably, from 5–400ppm of the above compounds are added to the water so as to obtain the surprising increase in steam generation efficiency which has been observed in actual industrial boilers. These compounds may or may not be formulated with other ingredients such as scale control additives and anti-foaming agents. Since the compounds enumerated above which are useful in this invention have inverse water solubility, that is, they are more soluble in cold than in hot water, they may be added to the water as liquids dissolved in water to provide a convenient method. This provides a convenient and useful method for the application of compounds of these types. In order to further illustrate the great utility of this invention, the following examples are presented:

EXAMPLES

Example 1

This example illustrates the preparation of a compound useful in the instant invention. 20.2 parts of diethyleneglycol and 0.2 parts by weight of potassium hydroxide were charged to reactor and heated to approximately 135° C. During this time, the pressure reached 15 lbs. per square inch at which time a mixed solution containing 27.8 parts propylene oxide and 51.8 parts ethylene oxide were added. This solution was added over a 2 hour period at an approximate temperature of 145° C. The mixture was held in the reactor for an additional 2 hours before cooling.

73.2 Parts of the above polymer were charged to a reactor along with 0.6 parts of a $BF_3$ ether complex. The reaction mixture was heated to 60° at which time 26.2 parts epichlorohydrin was added slowly. The temperature was allowed to increase to 95° C., and was held at that temperature for 1 hour.

30.8 Parts of the above polymer was then added slowly to a reaction vessel containing 1.7 parts water and 22.0 parts hexamethylene diamine bottoms at 130° C. The polymer was added over a 2 hour period at which time the temperature was then cooled to 120° C. and 27.5 parts of water was added. 2.2 parts of 1,4-dichlorobutene-2 was then added to the reactor with stirring with the final product being neutralized to a pH of approximately 3.5 with 15.8 parts of concentrated hydrochloric acid. This compound will be designated as "A."

Example 2

Cloud points to determine the relative solubilities of the above compounds were run at a level of 1000 ppm in distilled water. The approximate cloud point of compound A at pH values ranging from 5-9 was 212° F. At pHs 9-11, this value fell off rapidly to a cloud point of 140° F. at pH 11.

Example 3

A glass distillation apparatus including a round bottom flask fitted with a rheostat controlled heating mantel and insulated with glass wool was set up. The rheostat was left at one setting to insure a constant heat source and operated by the on/off switch only. Condensate formation rates were determined at various dosages of several additives and with no additives. By measuring the weight of condensate formed at fixed time intervals, the slope of a line resulting from the plot of condensate formed versus time yield the rate of condensate formation.

TABLE I

| Additive | ppm Additive | Rate Distillation | % Incr. |
|---|---|---|---|
| θ | — | 4.40 cc/min | 0.0 |
| A | 50 | 4.60 | + 4.5 |
|   | 100 | 4.68 | + 6.4 |
|   | 200 | 4.49 | + 2.0 |

Examples 4–19

A thermosyphon reboiler was constructed from stainless steel and was capable of operating at pressures up to 100 psig. A 4 l. steam drum was fitted with a 3 foot, 1 inch O.D. downcomer, and a 3.5 foot, ½ inch O.D. riser contained in a 1 inch O.D. shell. A steam source was regulated and maintained through the shell by a steam trap. A pressure relief valve protected the steam drum from excessive pressure, which was monitored. The steam generation loop could be drained from the bottom and filled from the top. Steam drum pressure was regulated by a ¼ inch needle valve with the steam condensing in a sample cooler. Condensate was measured upon leaving the sample cooler.

Condensate formation rates were measured at various dosages of the compounds illustrated in Examples 1 and 2. Runs were performed using distilled water and using the quantities of additives detailed in the attached table. The water was maintained at a pH of 10.0. Condensate formation rates were determined by repeated measurements and the volume generated in a 1-minute interval over a 30-minute time span. Blanks were run before and after the use of additives to make sure that no residual additive remained in the water and the reboiler. The results including percent increase in steam generation achieved using the compounds of this invention are found in the accompanying table.

TABLE II

| Ex. | CMPD | Dosage ppm | Pressure-psi Shell | Pressure-psi Steam Drum | Steam Gen. Rate cc/min. | % Improvement |
|---|---|---|---|---|---|---|
| 4 | — | — | 40 | 20 | 57 | 0.6 |
| 5 | A | 100 | 90 | 30 | 170 | 9.6 |
| 6 | — | — | 90 | 30 | 155 | — |
| 7 | — | — | 40 | 20 | 57 | — |
| 8 | A | 100 | 40 | 20 | 58 | 1.7 |
| 9 | A | 50 | 40 | 20 | 66 | 15.8 |
| 10 | A | 75 | 40 | 20 | 65 | 14.0 |
| 11 | — | — | 40 | 20 | 57 | — |
| 12 | A | 100 | 40 | 20 | 61 | 7.0 |
| 13 | A | 200 | 40 | 20 | 66 | 15.8 |
| 14 | — | — | 40 | 20 | 57 | — |
| 15 | A | 100 | 40 | 20 | 66 | 15.8 |
| 16 | A | 400 | 40 | 20 | 66 | 15.8 |
| 17 | — | — | 40 | 20 | 57 | — |
| 18 | A | 25 | 40 | 20 | 63.5 | 0.5 |
| 19 | — | — | 40 | 20 | 58 | — |

Having thus described my invention, I claim:

1. A method for increasing the efficiency of steam generation units operating at pressures of from 10–200 psi which comprises:
  A. Adding to the water in the steam generation unit that is used to generate steam from 5–400 ppm of a polyether polyamine having been formed by the steps comprising:
    1. Reacting a polyalkylene oxide, said alkylene oxide selected from the group consisting of ethylene oxide, propylene oxide, butylene oxide and mixtures thereof, with a lower difunctional epoxide selected from the group consisting of epichlorohydrin, epibromohydrin, and epiiodohydrin in a mole ratio of hydroxyl groups present on said polyalkylene oxide to lower difunctional epoxide of from 0.5:1 to 1:0.5, said polyalkylene oxide further characterized as having a molecular weight of from 100–1,000 whereby a capped polyalkylene oxide is formed;
    2. Reacting the capped polyalkylene oxide of step 1 with a lower aliphatic amine having from 2–8 carbon atoms and two or more amino groups in a mole ratio of from 1:5 to 1:1 based on the number of amino groups present on the amine compound and the number of halogens on the capped polyalkylene oxide; and then,
    3. Recovering the polyether polyamine.
  B. Generating steam from the water contained in the steam generation unit; and then,
  C. Recovering an increased amount of steam from said steam generation unit.

2. The method of claim 1 wherein the amine is hexamethylene diamine and the polyalkylene oxide has a ratio of ethylene oxide to propylene oxide units of 50:50 to 90:10.

3. The method of claim 1 wherein the lower difunctional epoxide is epichlorohydrin.

4. A method for increasing the efficiency of steam generation units operating at pressures of from 10–200 psi which comprises:

A. Adding to the water in the steam generation unit that is used to generate steam from 5–400 ppm of a polyether polyamine having been formed by the steps comprising:
1. Reacting a polyalkylene oxide, said alkylene oxide selected from the group consisting of ethylene oxide, propylene oxide, butylene oxide and mixtures thereof, with a lower difunctional epoxide selected from the group consisting of epichlorohydrin, epibromohydrin, and epiiodohydrin in a mole ratio of hydroxyl groups present on said polyalkylene oxide to lower difunctional epoxide of from 0.5:1.0 to 1.0:0.5, said polyalkylene oxide further characterized as having a molecular weight of from 100 to 1,000 whereby a capped polyalkylene oxide is formed;
2. Reacting the capped polyalkylene oxide of step 1 with a lower aliphatic amine having from 2–8 carbon atoms and two or more amino groups in a mole ratio of from 1:5 to 1:1 based on the number of amino groups present on the amine compound and the number of halogens on the capped polalkylene oxide;
3. Reacting the polyether polyamine of step 2 with a cross-linking agent, said cross-linking agent selected from the group consisting of ethylene dichloride, ethylene dibromide, 1,4-dichloro 2-butene, propylene dichloride, and epihalohydrins in a mole ratio of cross-linking agent to amine functionality added in step 2 above of from 0.1–1.6 whereby a cross-linked polyether polyamine is formed; and then,
4. Recovering the polyether polyamine.

B. Generating steam from the water contained in the steam generation unit; and then,
C. Recovering an increased amount of steam from said steam generation unit.

5. The method of claim 4 wherein the amine is hexamethylene diamine and the polyalkylene oxide has a ratio of ethylene oxide to propylene oxide units 50:50 to 90:10.

6. The method of claim 4 wherein the lower difunctional epoxide is epichlorohydrin.

7. The method of claim 4 wherein the cross-linking agent is 1,4-dichloro 2-butene.

8. The method of claim 4 wherein the cross-linking agent is an epihalohydrin.

* * * * *